March 25, 1924.
L. E. PROUTY
AUTOMOBILE TRUNK RACK
Filed Dec. 11, 1922
1,487,974
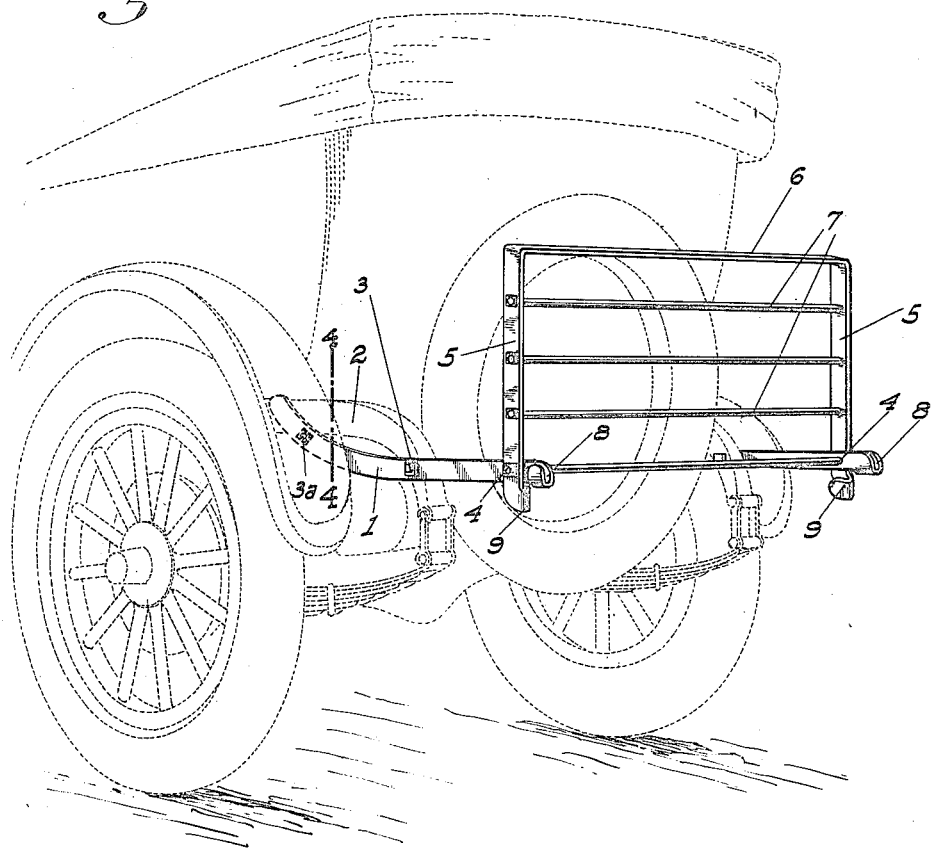
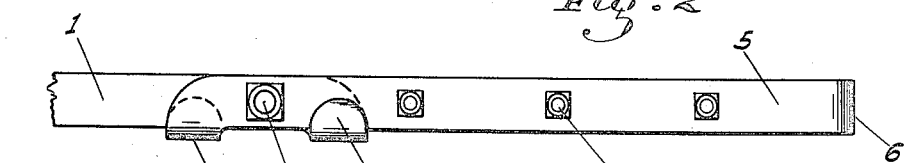
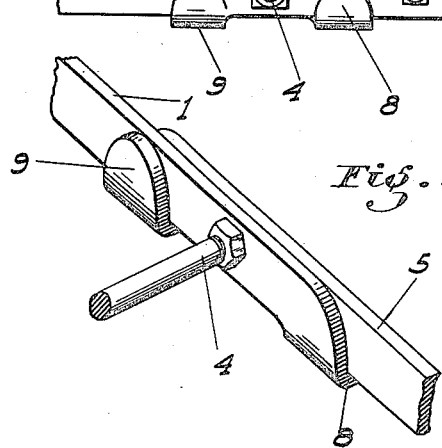
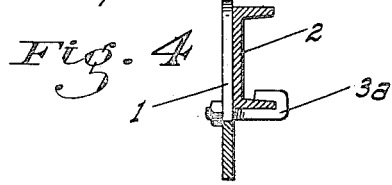
INVENTOR.
Lee E. Prouty
BY
ATTORNEY Patented Mar. 25, 1924.

1,487,974

UNITED STATES PATENT OFFICE.

LEE E. PROUTY, OF WATERFORD, CALIFORNIA.

AUTOMOBILE TRUNK RACK.

Application filed December 11, 1922. Serial No. 606,059.

*To all whom it may concern:*

Be it known that I, LEE E. PROUTY, a citizen of the United States, residing at Waterford, county of Stanislaus, State of California, have invented certain new and useful Improvements in Automobile Trunk Racks; and I do declare the following to be a full, clear, and exact description of the same, reference being had to the accompanying drawings, and to the characters of reference marked thereon, which form a part of this application.

This invention relates to improvements in automobile accessories, and particularly to a folding trunk or luggage rack adapted to be mounted on to an automobile at the rear end thereof.

The principal object of my invention is to provide a rack of this character so constructed that when outstretched or moved to its load supporting position, a double lock arrangement, positively preventing sagging of the rack, will be placed in action.

This double lock feature eliminates any shearing strain being placed on the hinge pins or bolts which must be provided to enable the rack to be folded up, and enables much smaller bolts and adjacent parts being used than can otherwise be done, without any sacrifice of strength over that type which depends on the resistance to shear of any bolts for its rigidity.

A further object of the invention is to produce a simple and inexpensive device and yet one which will be exceedingly effective for the purposes for which it is designed.

The objects I accomplish by means of such structure and relative arrangement of parts as will fully appear by a perusal of the following specification and claims.

In the drawings similar characters of reference indicate corresponding parts in the several views.

Fig. 1 is a perspective outline of the rear end of an automobile, showing my improved rack installed thereon, in folded position.

Fig. 2 is a detached side view of the rack outstretched.

Fig. 3 is a fragmentary perspective view of the double lock feature of the rack.

Fig. 4 is a fragmentary cross section on line 4—4 of Fig. 1.

Referring now more particularly to the characters of reference on the drawings, the numeral 1 denotes a pair of horizontal supports, preferably of strap iron or the like set in a vertical plane, which are attached to and outside of the main frames 2 of the car at two longitudinally spaced points, the rear means of attachment being bolts 3, and the forward means being hook bolts 3ª passing through the supports and hooked over the lower side of the frames 2, which as customary, are channel shaped as shown. The supports project rearwardly of said frames a sufficient distance to clear any accessories carried on the back of the car, such as spare tires and the like.

Pivotally mounted on the supports 1 a short distance from the ends thereof by means of bolts 4 or the like is the rack proper, comprising a three-sided rectangular frame having side members 5 and a rear end connecting bar 6, the members 5 and 6 being preferably formed integral. The area included between the members 5 and 6 may be filled in solid but is preferably spanned at intervals by bars or rods 7 of sufficient strength of course to support any articles which may be placed thereon.

The outer ends of the members 1 are bent outwardly and up to form hooks or cradles 8 to support the lower edges of the members 5 to the rear of the pivotal bolts when said members are turned down to lie in a horizontal position, while the ends of the members 5 are turned inwardly and up to form similar hooks 9 adapted to bear against the under edges of the supports 1 ahead of the bolts 4 when the rack is moved to lie horizontally. It will of course be understood that the hooks 8 and 9 will be thus formed outwardly and inwardly respectively when the rack frames 5 lie outside the supports 1. If the said frames are positioned inside the supports, the arrangement of the hooks will be reversed.

It will thus be seen that when the rack is outstretched, which is of course the only position in which it is called upon to carry any load, it is supported by the members 1 both ahead and to the rear of the pivotal bolts 4, without throwing any strain on the latter, and the only function of which is to serve as hinge pins for the rack and to prevent longitudinal movement thereof.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A folding rack comprising a pair of rigid supports, a rack structure pivotally mounted in the supports and extending therebetween, the outer ends of the supports having projections adapted to engage the under edges of the rack to the rear of the pivotal connection thereof when said rack is moved to lie in a horizontal position, and the adjacent ends of the rack structure having similar projections adapted to abut against the under edges of the supports ahead of the pivotal connection of the rack when the latter is moved to said horizontal position.

2. A folding rack comprising a pair of rigid horizontal supports, a rack structure pivotally mounted in the supports, said rack including a surrounding frame, cradles formed at the outer ends of the supports for supporting said frame to the rear of its pivotal connection when moved to a horizontal position, and similar cradles formed on the frame ahead of the pivotal connection thereof for then engaging the supports ahead of said pivotal connections.

In testimony whereof I affix my signature.

LEE E. PROUTY.